March 9, 1948.

T. S. BRISKIN ET AL 2,437,591

ELECTRIC CONTROL DEVICE

Filed April 27, 1944

Inventors:
Theodore S. Briskin
Joseph Golick
Jack Briskin
By Zabel, Carlson, Greitzaugh & Wells
Attorneys March 9, 1948.  T. S. BRISKIN ET AL  2,437,591
ELECTRIC CONTROL DEVICE
Filed April 27, 1944  2 Sheets-Sheet 2
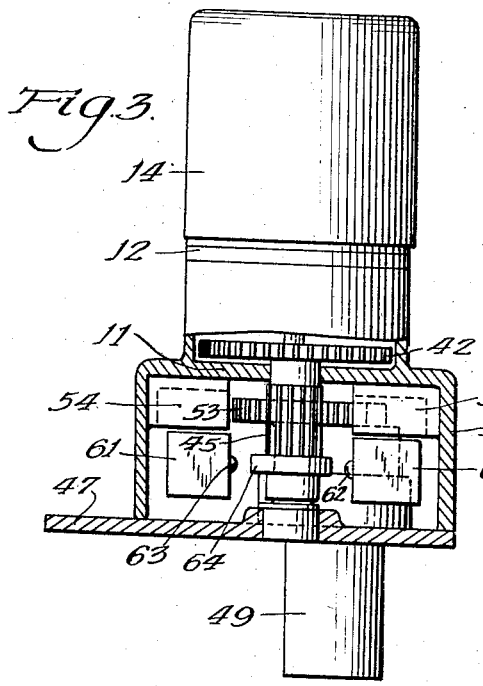
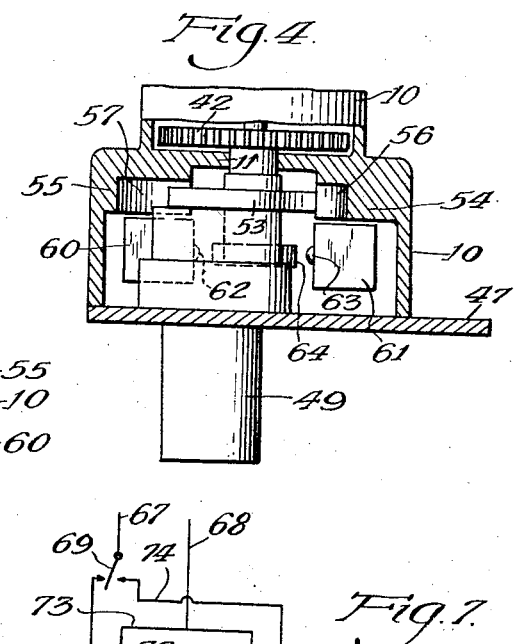
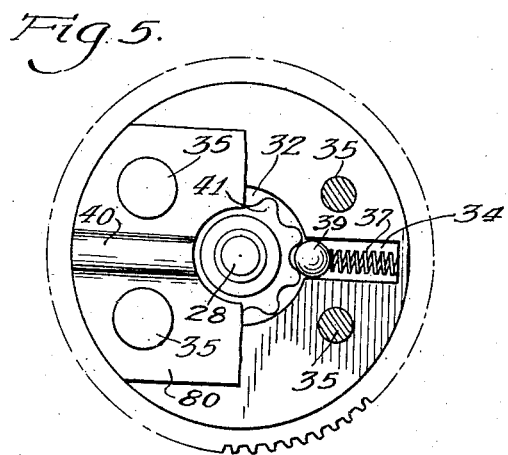
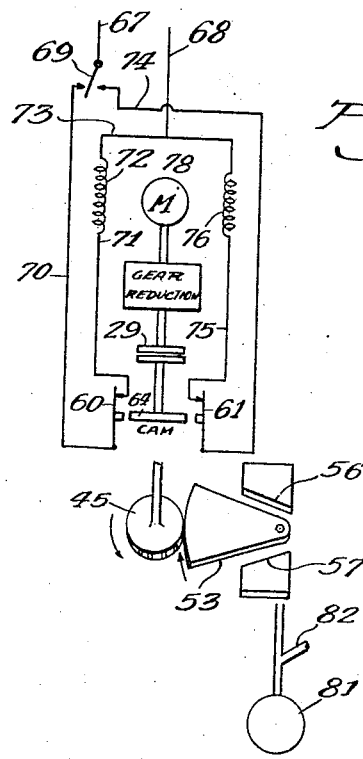
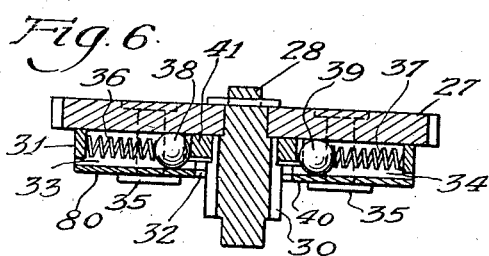
Inventors:
Theodore S. Briskin
Joseph Golick
Jack Briskin
By Zabel, Carlson, Fitzhaugh & Wells
Attorneys Patented Mar. 9, 1948

2,437,591

UNITED STATES PATENT OFFICE 2,437,591

ELECTRIC CONTROL DEVICE

Theodore S. Briskin, Jack Briskin, and Joseph Golick, Chicago, Ill., assignors to Revere Camera Company, Chicago, Ill., a corporation of Delaware Application April 27, 1944, Serial No. 533,086

4 Claims. (Cl. 192—150)

This invention relates to an electrical control device for causing rotation of an element through a predetermined angle, and in particular to an improved construction therefor which permits a high degree of accuracy in the angle of rotation.

In this type of electrical control device, the rotation is caused by a motor having both forward and reverse field windings. The extent of rotation in either direction is controlled by opening the motor circuit, after the driven element has rotated through a predetermined angle. This method of control, however, is objectionable because of the overthrow due to the inertia of the motor armature, and of other rotating parts. In certain applications, as for instance where the voltage and current conditions vary considerably, the overthrow will vary in such a manner that it cannot be compensated by proper design.

This invention contemplates the provision of positive blocking means for the driven element of a device of this particular type, and the introduction of a slippage between the motor and the driven element so that the overthrow will not affect the blocked position of the driven element, or damage the apparatus.

In devices of this type, it has also been found to be desirable to provide other means of rotating the driven element, such as a handle for the manual rotation thereof. In previous devices of this type, however, such manual rotation will generally strip the gears of the electric control device for the reason that the motor is a small motor of comparatively high speed which has been geared down considerably. In this connection it has been found that the introduction of a clutch device in the reduction gears permits this manual operation to take place without harmful effect upon the control device.

It is an object of this invention to provide an improved electrical control device of the class described wherein the extent of rotation of the driven element is closely and accurately limited.

It is a further object of this invention to provide an improved construction for an electrical control device which will not be damaged by a positive blocking of the driven element, or a manual rotation thereof.

It is still another object of this invention to provide an improved clutch construction which offers the same resistance in either direction of rotation.

A still further object is to provide an electrical control device of an improved and compact construction wherein an inexpensive high speed motor may be utilized for the actuation of the driven element.

Other objects, features and advantages will become apparent as this description proceeds.

With reference now to the figures, in which like reference numerals designate like parts:

Fig. 3 is an end view, partially in section, along the line 3—3 of Fig. 1;

Fig. 4 is a section along the line 4—4 of Fig. 2;

Fig. 5 is an enlarged elevation of the clutch, a portion of the cover being broken away;

Fig. 6 is a transverse diametrical section of the clutch; and

Fig. 7 is a diagrammatic representation of an electrical circuit including that embodiment of this invention which has been illustrated in detail in the preceding figures.

Figure 1:
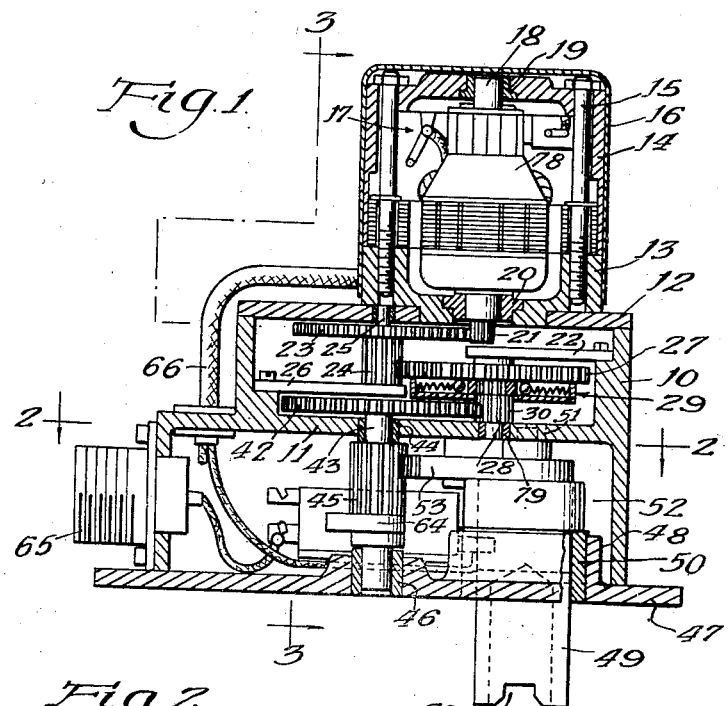
Fig. 1 is a sectional elevation of a preferred embodiment of this invention.

With reference now to Fig. 1, the reference numeral 10 designates a die cast housing having a central web member 11. A top cover plate 12 is provided to which is suitably secured, as by screws, the lower half 13 of a motor housing. The upper half 14 of the motor housing is secured to the lower half by suitable studs 15. A cup-shaped cover 16, drawn from sheet metal, may be slipped over the housings 13 and 14.

A motor 17 is disposed within the housings 13 and 14, and is provided with forward and reverse field windings 72 and 76, respectively, which are illustrated in Fig. 7, and will be referred to in detail hereinafter. The motor is also provided with an armature 78 mounted on an armature shaft 18, the latter being journalled in bearings 19 and 20. Bearing 19 is positioned in the upper motor housing 14, and bearing 20 is positioned in the lower motor housing 13, and extends therethrough, being provided with a pinion 21.

The pinion 21 drives a gear 23 which together with a pinion 24 is mounted on a shaft 25, the latter being journalled in the top cover plate 12, and a bracket 26. The bracket 26 may be suitably mounted from the inner wall of the housing 10.

The pinion 24 drives a gear 27 which is rotatably mounted on an arbor 28, the latter being journalled in a suitable thrust bearing 79 disposed in the web 11, and in a bracket 22, suitably mounted and extending inwardly from the side wall of the housing 10. The gear 27 is associated with the arbor 28 by a clutch mechanism designated generally by the reference numeral 29, and shown in detail in Figs. 5 and 6.

The clutch mechanism includes a disk-shaped body member 31, having a central opening 32, and being provided with two radial slots 33 and 34. The body member 31, together with an overlying cover 80, is secured to the gear 27 by means of suitable rivets 35. Coil springs 36 and 37 are positioned in the slots 33 and 34, together with balls 38 and 39 which are urged centrally of the body member 31 by means of the springs, the other ends of the springs reacting against the ends of the slots 33 and 34. A round tooth ratchet 41 is staked to the arbor 28, and is disposed centrally of the balls 38 and 39, so that rotation of the gear 27, to which the clutch body member 31 is riveted, will tend to rotate the arbor 28.

The cover 80 is provided with a crimp 40 which overlies and cooperates with the slots 33 and 34 to provide a chamber in which the balls and springs are confined.

The arbor 28 is provided with integrally formed teeth 30 which mesh with and drive a gear 42 which is secured to a shaft 43. The shaft 43 is journalled in a bushing 44 disposed in the web member 11, and in a bushing 46 which is disposed in a bottom cover plate 47. As indicated in Figs. 1 and 3, this shaft extends through the web member 11 and the gear 42 is secured to the shaft just above the web member. The central portion of the shaft 43 is provided with a pinion 45.

In operation it will be seen that the gears and pinions above described are arranged in a manner so as to greatly reduce the speed of the motor. The clutch 29 permits the pinion 45 to be rotated in either direction without causing rotation of the armature shaft 18. The strength of the springs 36 and 37, together with the shape of the teeth on the round tooth ratchet 41, are so proportioned with respect to the speed reduction gears on the motor side of the clutch, that the clutch will slip upon the application of a torque which is less than the torque required to set the armature in motion with a high degree of acceleration. The design of the clutch 29 is such that the slippage torque is substantially the same in either direction.

The bottom cover plate 47 is provided with a boss 48 through which a driven shaft 49 extends. A bushing 50 is provided in the boss 48 for the driven shaft, and the upper end of the driven shaft cooperates with a thrust bearing 51 disposed in the web 11. The driven shaft 49 is formed with a collar 52 which rides on the edge of the bushing 50 and prevents removal of the driven shaft from the apparatus.

Figure 2:
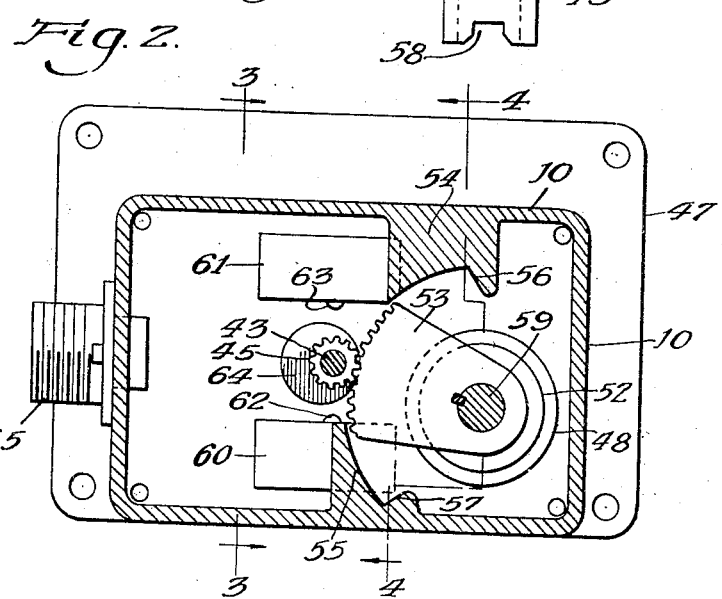
Fig. 2 is a section along line 2—2 of Fig. 1.

A segment gear 53 is keyed to the driven shaft 59, and meshes with and is driven by the pinion 45. Integrally formed with the web 11 are depending lugs 54 and 55 each of which is provided with stop faces 56 and 57 which project into the path of the segment 53 so as to limit its rotation in either direction. In Fig. 2, the segment is shown in an intermediate position, and the arrangement of the stop faces is such as to permit a rotation of about 30 degrees in either direction from the intermediate position shown, thereby permitting a total movement of about 60 degrees. The lower portion of the driven shaft 49 is recessed and slotted as indicated by the reference numeral 58, so that it may be attached to the particular device, the rotation of which is to be controlled by the apparatus herein described.

Suitably secured to the opposite side walls of the housing 10, and beneath the path of movement of the segment 53, are two switches 60 and 61. These may be of any suitable type wherein the contacts are biased to the closed position, and are opened by the depression of buttons 62 and 63, respectively. The buttons 62 and 63 are aligned on opposite sides of the shaft 43, and are actuated by a cam 64 which is secured to said shaft.

The shape of the cam and the gearing is such that at the time the button 62 is depressed, to open the circuit through its associated motor winding, one edge of the segment 53 has been rotated into contact with stop face 56. Similarly, when the cam 64 presses button 63, the opposite edge of the segment 53 contacts the stop face 57.

The wall of the housing 10 is provided with a screw-threaded terminal plug 65 by means of which suitable electrical connections may be made. A conduit 66 extends from the lower portion of the housing 10 to the lower motor housing 14, to accommodate the necessary conductors leading to the motor 17.

The operation of the various parts of the apparatus has been pointed out above in connection with the description of those parts. The operation of the device as a whole is best understood by reference to the diagram of Fig. 7.

The leads 67 and 68 connect with a suitable source of power. In series with lead 67 is a single pole double throw switch 69, or its equivalent, by means of which connections alternatively may be made to the forward field coil 72 or the reverse field coil 76, through conductors 70 and 74, respectively. The conductor 70 leads from one pole of the switch 69 to the switch 60 which is biased to the closed position. A lead 71 connects the switch 60 with the forward field coil 72, and a return lead 73 connects the field coil with the conductor 68.

Similarly, the conductor 64 extends from the other pole of the switch 69 to the switch 61, and a lead 75 connects the switch 61 with the reverse field coil 76. A return conductor 77 extends from the field coil 76 to the conductor 68. In normal operation, the switch 69 has been thrown into contact with one or the other of the conductors 70 or 74. Assuming that it has just been thrown into contact with conductor 70, it will be seen that the forward field coil 72 has been energized, thereby causing rotation of the pinion 45 in the counterclockwise direction. This has caused the segment 53 to be rotated in the clockwise direction, out of contact with the stop face 57. At the time that the segment 53 contacts stop face 56, the cam 65 will cause the switch 60 to be opened, thereby opening the circuit through the forward field. The segment 53 obviously cannot rotate any further in the clockwise direction, but if the inertia of the armature 78 causes further rotation thereof, this will be taken up by the clutch 29, and will cause no damage to the reduction gears.

Similarly, if the switch 69 is thrown into contact with conductor 74, the circuit through the reverse field coil 76 will be closed until such time as the segment 53 has been rotated in the counterclockwise direction into contact with the stop face 57.

Obviously the electrical control device which forms the subject of this invention may be applied to a number of uses. For instance as shown diagrammatically in Fig. 7, it may be used to actuate a valve 81. The valve may also be provided with a handle 82 for manual operation thereof, in case of power failure. It will be seen that rotation of the handle 82 will not strip the gears 27 and 23, or the pinions 24 and 21, because of the presence of the clutch 29. The gearing on the driven side of the clutch 29 is of sufficiently heavy construction to carry the slippage torque for the clutch.

It will be observed that if for any reason the throw of the driven element is blocked by exterior forces, that no strain will be put on the motor or the gears. However, the motor 17 will keep running, and the clutch 29 will keep slipping until such exterior force is removed and the driven element is permitted to rotate to its extreme position. Due to the improved form of clutch shown herein, the operation of the control device will be the same in either direction. That is, it will carry as big a load in rotating the driven element in one direction as it will in the opposite direction.

It will be seen that the provision of the blocking means, which include the stop faces 56 and 57, prevent the overthrow of the motor to such an extent that the cam passes beyond the buttons 61 or 60, as the case may be, and thereby prevents the closing of the reverse or forward field winding respectively, which would cause rotation of the driven element beyond its intended position. In other words, with devices of this type, where the driven element and the circuit opening means are both actuated by the same motor, this invention eliminates the danger of having the circuit opening means overthrow to a closed circuit position, which in turn would cause further rotation of the driven element.

Although only a preferred embodiment of this invention has been shown and described herein, it is obvious that numerous modifications and changes may be made therein without departing from the spirit of this invention. The drawings and the foregoing description are intended to be illustrative only, and the invention is to be limited only by the appended claims.

We claim:

1. A control device for rotating a driven element in either direction through a given angle comprising a housing, a gear sector mounted on said driven element within said housing, blocking means projecting from a portion of said housing for limiting the displacement of said driven element in either direction, electrically controlled driving means for said gear sector including a forward driving circuit and a reverse driving circuit which are adapted to be alternatively energized, means to open said forward driving circuit at about the time when said gear sector has been rotated into contact with one of said blocking means, similar means to open said reverse driving circuit at about the time when said gear sector has been rotated into contact with the other of said blocking means, a cam driven by said driving means for alternately engaging one or the other of said circuit opening means, said cam being of the type which may rotate beyond the two circuit opening positions, and clutch means interposed between said driving means and said gear sector.

2. A control device for rotating an output shaft in either direction through a given angle comprising a housing having a recessed wall, a gear sector disposed in said recess and secured to said output shaft, said recessed wall being in the form of a sector shape and being provided with stop bases which constitute blocking means for limiting the displacement of said gear sector in either direction, electrically controlled driving means for said gear sector including a forward driving circuit and a reverse driving circuit which are adapted to be alternatively energized, means to open said forward driving circuit at about the time when said gear sector has been rotated into contact with one of said blocking means, similar means to open said reverse driving circuit at about the time when said gear sector has been rotated into contact with the other of said blocking means, and means to limit the load on said driving means to a predetermined maximum which is substantially the same for either direction of rotation.

3. In an electric control device of the class described, a housing, a motor disposed in said housing and having both forward and reverse field windings in parallel with each other, a driving shaft journaled in said housing, speed reduction gears interposed between said motor and said driving shaft, a cam on said driving shaft, circuit opening means in series with each of said field windings and adapted to be alternatively engaged by said cam, a driving gear on said driving shaft, an output shaft journaled in said housing, said housing including an arcuate shaped recess disposed about said output shaft and being provided with substantially radially disposed stop faces, and a toothed sector secured to said output shaft and disposed in said recess, and adapted to engage one or the other of said stop faces to limit the rotation of said output shaft in the forward and in the reverse direction, said cam and said circuit opening means being arranged so that the circuit through said forward field winding will be opened when said sector has been rotated into contact with one of said stop faces, and so that the circuit through said reverse field winding will be opened when said sector has been rotated into contact with the other of said stop faces.

4. In an electric control device of the class described, a housing, a motor disposed in said housing and having both forward and reverse field windings in parallel with each other, a driving shaft journaled in said housing, speed reduction gears interposed between said motor and said driving shaft, a cam on said driving shaft, circuit opening means in series with each of said field windings and adapted to be alternatively engaged by said cam, a driving gear on said driving shaft, an output shaft journaled in said housing, said housing including an arcuate shaped recess disposed about said output shaft and being provided with substantially radially disposed stop faces, a toothed sector secured to said output shaft and disposed in said recess, and adapted to engage one or the other of said stop faces to limit the rotation of said output shaft in the forward and in the reverse direction, said cam and said circuit opening means being arranged so that the circuit through said forward field winding will be opened at about the time said sector has been rotated into contact with one of said stop faces, and so that the circuit through said reverse field winding will be opened at about the time when said sector has been rotated into contact with the other of said stop faces, and means for taking up the overthrow of said motor after the rotation of said sector has been stopped by one or the other of said end walls.

THEODORE S. BRISKIN.
JACK BRISKIN.
JOSEPH GOLICK.

REFERENCES CITED

The following references are of record in the file of this patent:

UNITED STATES PATENTS

| Number | Name | Date |
|---|---|---|
| 1,184,345 | Harley | May 23, 1916 |
| 1,678,945 | Jones | July 31, 1928 |
| 1,932,040 | Hunter | Oct. 24, 1933 |
| 2,114,013 | Ball | Apr. 12, 1938 |
| 2,164,309 | Collins | July 4, 1939 |
| 2,267,114 | Lear et al. | Dec. 23, 1941 |
| 2,284,353 | Allen | May 26, 1942 |
| 2,342,540 | Hale | Feb. 23, 1944 |
| 2,391,333 | Nardone | Dec. 18, 1945 |
| 2,397,861 | Hoover | Apr. 2, 1946 |